(No Model.)
J. P. ENGLE.
RECOVERING WASTE PRODUCTS OF PETROLEUM.
No. 481,391. Patented Aug. 23, 1892.
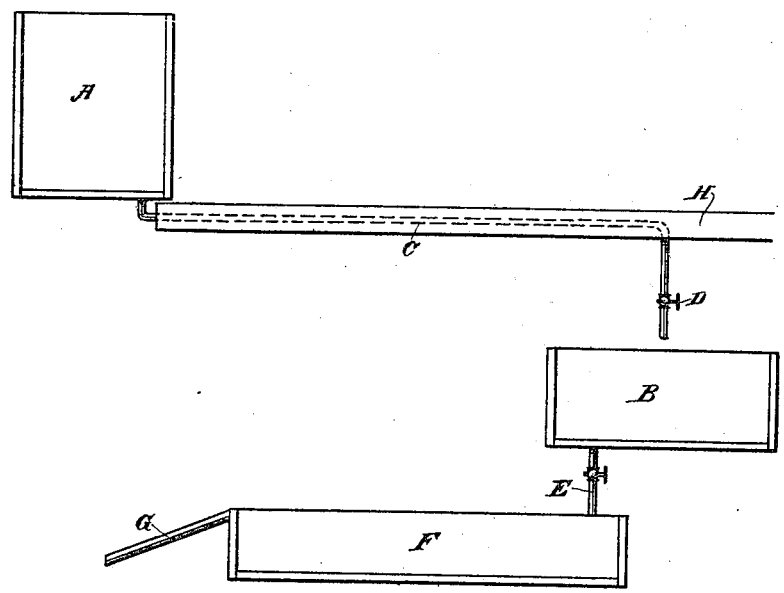

UNITED STATES PATENT OFFICE.

JACOB P. ENGLE, OF SAN FRANCISCO, CALIFORNIA.

RECOVERING WASTE PRODUCTS OF PETROLEUM.

SPECIFICATION forming part of Letters Patent No. 481,391, dated August 23, 1892.

Application filed December 11, 1891. Serial No. 414,740. (No specimens.)

*To all whom it may concern:*

Be it known that I, JACOB P. ENGLE, a citizen of the United States, residing in the city and county of San Francisco, State of California, have invented an Improvement in Recovering Waste Products of Petroleum; and I hereby declare the following to be a full, clear, and exact description of the same.

My invention relates to means for recovering the waste products of petroleum arising from the manufacture of gas, which will be more fully explained by reference to the accompanying drawing, in which—

The figure represents one form of apparatus adapted for this purpose.

The object of my invention is to recover the waste products of petroleum which are found in conjunction with water and have a specific gravity so nearly the same that it is impossible to separate them by ordinary means.

In the manufacture of gas from petroleum a part of the waste product which arises therefrom is unlike coal-tar from the fact that it is so nearly the same specific gravity of the water that it will not separate by gravitation. Furthermore, the constituents of this petroleum-oil are tough and elastic and cover the globules of water, so that the necessary heat required to convert the water into steam, and thus evaporate it, only serves to create a foam, which on cooling again leaves the original constituents the same as before boiling.

In order to make a complete separation of the water from the heavy oil, I employ any waste-absorbent material, such as sawdust, shavings, cotton and woolen waste, rice-husks, bran, or other suitable absorbent material.

In carrying out my invention I employ any simple apparatus. In the present case I have shown a reservoir A, which is situated sufficiently high to allow the combined water and heavy oil or products to flow from it by gravitation. This liquid is led into the tank A if the source of supply is above the tank. Otherwise it may be pumped into the tank, from which it is allowed to flow through the pipe C and a controlling-cock D and fall into a second tank B, which I call the "mixer." Within this tank I place the dry material above described, and after a sufficient quantity is within the tank I allow the liquid to flow in upon it, the whole mass being turned over and intimately mixed with a shovel or by other suitable means. It will be manifest that if the work is carried on on a large scale any mechanical mixer may be employed for this purpose. When the mass is thoroughly mixed, the flow is shut off, and a cock in the pipe E, which leads from the bottom of the tank B, is opened, thus allowing the remaining liquid to flow off into the settler F. The peculiar quality of this petroleum compound is such that the lighter portion is more readily and rapidly absorbed by the dry material above described than the water. The consequence is that the oil and spirit will be absorbed first and the water will remain unabsorbed and will flow out through the pipe E into the settler F, carrying with it a small quantity of heavy oil or residue, which now, being freed and separated from the former product and water, will readily sink to the bottom of the settler F, leaving the water upon the surface. This water is drawn off by a pipe G and carried away to any point, leaving the heavier product at the bottom of the settler F. If it is desired to use the mixture which is made in the tank B for a fuel, it is placed in a proper receptacle and allowed to drain. It will then be found to produce a fuel equal in heat and endurance with the usual run of steam-coal.

If the valuable ingredients contained in the oil are desired for other purposes than fuel, it may be separated from this material by means of a press, in which the material may be treated in the usual manner of operating such presses, and the residue or pomace which is left will still be valuable as a fuel.

The efficiency of the operation can be increased by means of a jet of steam, which is introduced through the pipe or casing H, which surrounds the pipe C, leading from the tank A to the tank B, the heat assisting in some manner the separation of the petroleum product from the water.

Having thus described my invention, what I claim as new, and desire to secure by Letters Patent, is—

The process of separating waste petroleum products in which the water globules are covered with petroleum-oil, consisting in mixing and agitating with such combined products a dry material which breaks up the globules by absorbing the lighter oil and spirit, then discharging the heavy oil or residue and water into a tank to enable the said heavy oil or residue to settle, and finally separating the water from the heavy oil or residue, substantially as herein described.

In witness whereof I have hereunto set my hand.

JACOB P. ENGLE.

Witnesses:
S. H NOURSE,
H. F. ASCHECK.